United States Patent
Dillman

(10) Patent No.: US 7,210,427 B1
(45) Date of Patent: May 1, 2007

(54) PORTABLE LIVESTOCK PANEL SYSTEM

(76) Inventor: Frank D. Dillman, 301 Canyon Rd., Grassy Butte, ND (US) 58634

( * ) Notice: Subject to any disclaimer, the term of this patent is extended or adjusted under 35 U.S.C. 154(b) by 0 days.

(21) Appl. No.: 10/937,038

(22) Filed: Sep. 8, 2004

(51) Int. Cl.
 A01K 3/00 (2006.01)
(52) U.S. Cl. .................................... 119/512
(58) Field of Classification Search ............... 119/512, 119/513; 256/65.01, 65.02, 65.11, 66, 65.15, 256/65.03, 65.04, 65.05, 65.06, 65.07, 65.08
See application file for complete search history.

(56) References Cited

U.S. PATENT DOCUMENTS

| | | | | |
|---|---|---|---|---|
| 1,258,460 A * | 3/1918 | Rees | ............................ | 256/66 |
| 3,614,068 A | 10/1971 | Koehl | ........................ | 256/19 |
| 3,858,555 A * | 1/1975 | Smith | ........................ | 119/513 |
| 4,145,031 A | 3/1979 | Baker, II | ...................... | 256/65 |
| 4,465,262 A | 8/1984 | Itri et al. | ....................... | 256/24 |
| 4,776,719 A * | 10/1988 | Kreider | ........................ | 403/24 |
| 4,836,143 A | 6/1989 | Shadbolt, Jr. | ................. | 119/20 |
| 5,063,876 A * | 11/1991 | Harris | ........................ | 119/513 |
| 5,170,746 A | 12/1992 | Roose | ........................ | 119/20 |
| 5,381,757 A | 1/1995 | Putney | ........................ | 119/20 |
| 5,609,327 A * | 3/1997 | Amidon | ................... | 256/65.01 |
| 5,649,689 A | 7/1997 | Wilson | ........................ | 256/24 |
| 5,676,894 A | 10/1997 | Specht | ....................... | 264/46.4 |
| 6,152,430 A * | 11/2000 | Thoman | ....................... | 256/66 |
| 6,561,493 B1 | 5/2003 | Lackey, Jr. | .................. | 256/73 |
| 6,588,732 B1 | 7/2003 | Caceres et al. | ............... | 256/19 |
| 6,679,481 B2 | 1/2004 | McNalley et al. | ........ | 256/65.12 |
| 2002/0000545 A1* | 1/2002 | Petit et al. | ..................... | 256/19 |
| 2004/0056241 A1* | 3/2004 | Calverley | ................ | 256/65.02 |

OTHER PUBLICATIONS

Underground Construction Products, Innerducthdpe.com, Website Printout, Jul. 2, 2004, 7 pages.
Piping Selection, Geothermal Heat Pump System, Website Printout, Jul. 2, 2004, 2 pages.
Heavy Duty Portable Livestock Panels, GoBob Pipe and Steel, Website Printout, Jul. 2, 2004, 3 pages.

* cited by examiner

Primary Examiner—Thomas Price

(57) ABSTRACT

A portable livestock panel system for effectively containing livestock in a humane manner. The portable livestock panel system includes a plurality of posts each having a plurality of receiver apertures and a plurality of fastener apertures, a plurality of cross members receivable within the receiver apertures of the posts, and a plurality of fastener members extendable through the fastener apertures within the posts and the cross members for securing the same. The posts and the cross members are preferably comprised of a resilient plastic material.

17 Claims, 6 Drawing Sheets

PORTABLE LIVESTOCK PANEL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to portable livestock panels and more specifically it relates to a portable livestock panel system for effectively containing livestock in a humane manner.

2. Description of the Related Art

Portable livestock panels have been in use for years. A conventional portable livestock panel is typically constructed of a plurality of metal posts with a plurality of metal cross members welded to the posts. Conventional livestock panels are typically relatively rigid and heavy.

One problem with conventional metal livestock panels is that they are neither flexible nor forgiving when an animal (e.g. horse, cow) or a human engages the same. Another problem with conventional metal livestock panels is that they are prone to bending and breakage when impacted by an animal. Another problem with conventional metal livestock panels is that they are relatively heavy and difficult for a single person to assemble.

While these devices may be suitable for the particular purpose to which they address, they are not as suitable for effectively containing livestock in a humane manner. Conventional metal livestock panels are not flexible.

In these respects, the portable livestock panel system according to the present invention substantially departs from the conventional concepts and designs of the prior art, and in so doing provides an apparatus primarily developed for the purpose of effectively containing livestock in a humane manner.

BRIEF SUMMARY OF THE INVENTION

In view of the foregoing disadvantages inherent in the known types of livestock panels now present in the prior art, the present invention provides a new portable livestock panel system construction wherein the same can be utilized for effectively containing livestock in a humane manner.

The general purpose of the present invention, which will be described subsequently in greater detail, is to provide a new portable livestock panel system that has many of the advantages of the livestock panels mentioned heretofore and many novel features that result in a new portable livestock panel system which is not anticipated, rendered obvious, suggested, or even implied by any of the prior art livestock panels, either alone or in any combination thereof.

To attain this, the present invention generally comprises a plurality of posts each having a plurality of receiver apertures and a plurality of fastener apertures, a plurality of cross members receivable within the receiver apertures of the posts, and a plurality of fastener members extendable through the fastener apertures within the posts and the cross members for securing the same. The posts and the cross members are preferably comprised of a resilient plastic material.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a portable livestock panel system that will overcome the shortcomings of the prior art devices.

A second object is to provide a portable livestock panel system for effectively containing livestock in a humane manner.

Another object is to provide a portable livestock panel system that may be folded into a compact structure for storage and/or transportation.

An additional object is to provide a portable livestock panel system that are flexible and that do not cause significant injury to an animal or human impacting the same.

A further object is to provide a portable livestock panel system that can be assembled by a single person.

Another object is to provide a portable livestock panel system that are resistant to bending or breaking.

Another object is to provide a portable livestock panel system that is capable of absorbing an impact from an animal or human.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
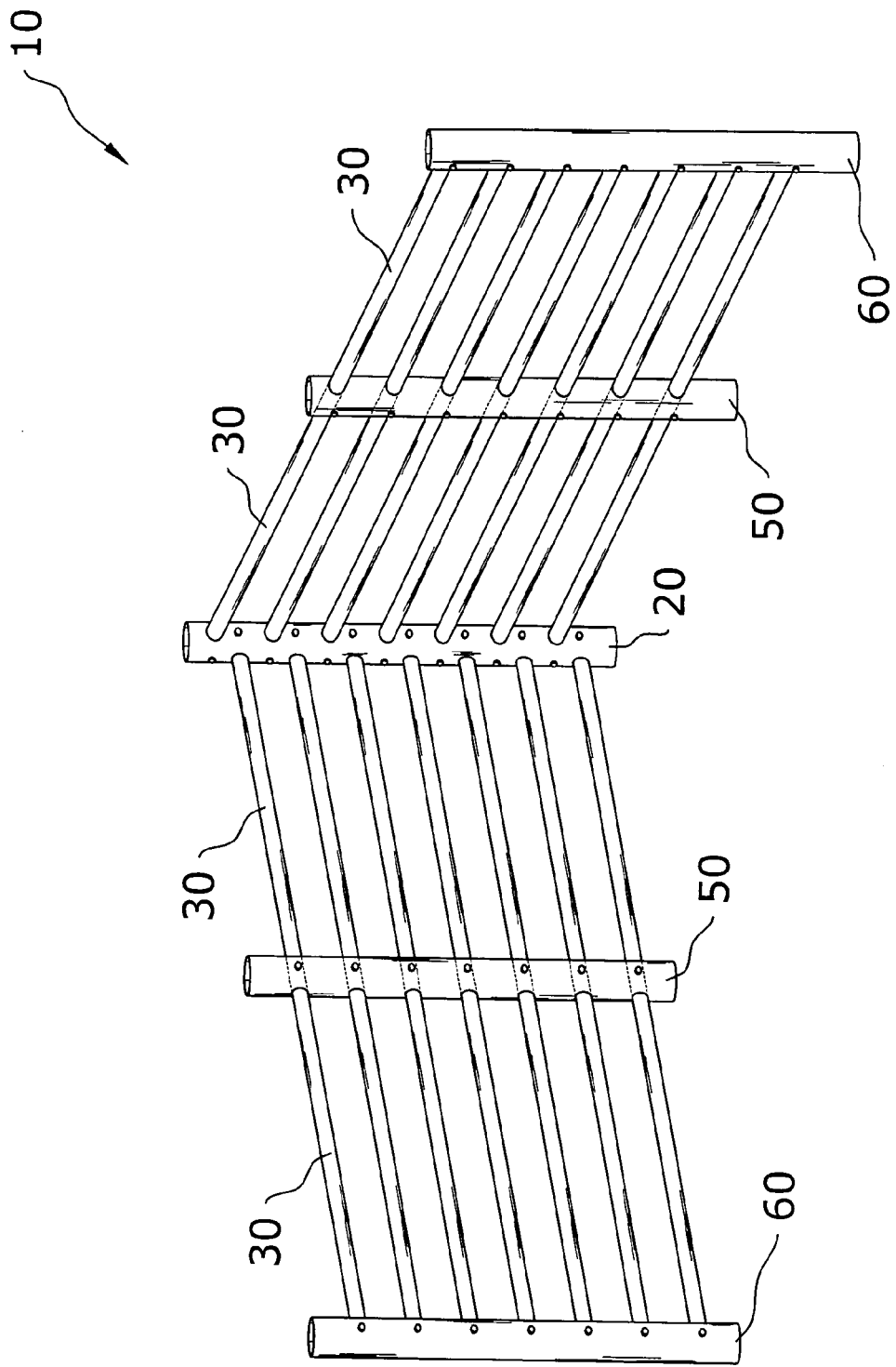
FIG. 1 is an upper perspective view of the present invention assembled.

Turning now descriptively to the drawings, in which similar reference characters denote similar elements throughout the several views, FIGS. 1 through 6 illustrate a portable livestock panel system 10, which comprises a plurality of posts each having a plurality of receiver apertures and a plurality of fastener apertures, a plurality of cross members 30 receivable within the receiver apertures of the posts, and a plurality of fastener members 40 extendable through the fastener apertures within the posts and the cross members 30 for securing the same. The posts and the cross members 30 are preferably comprised of a resilient plastic material.

B. Corner Posts

Figure 2C:
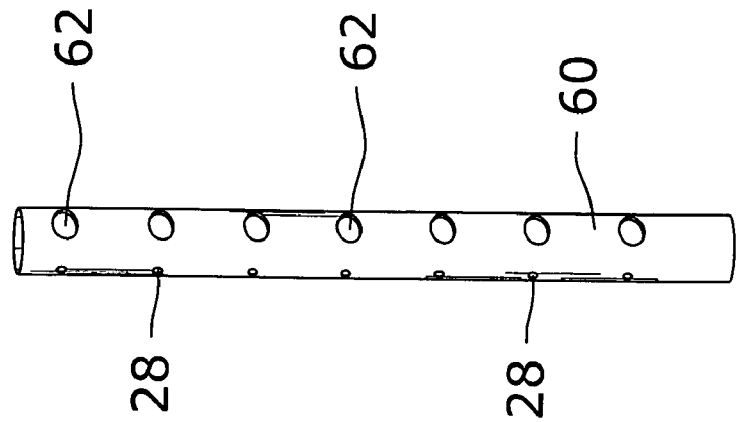
FIG. 2c is an upper perspective view of an end post.
Figure 2B:
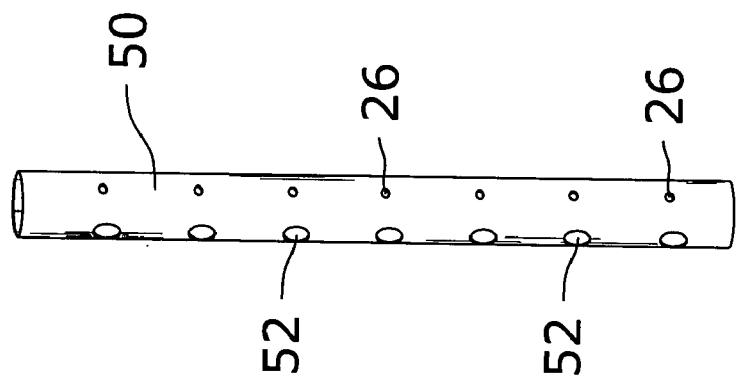
FIG. 2b is an upper perspective view of a center post.
Figure 2A:
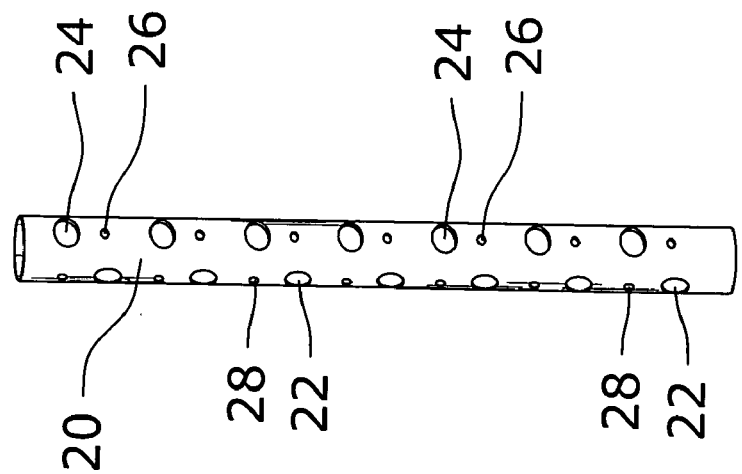
FIG. 2a is an upper perspective view of a corner post.

The corner post 20 is comprised of an elongated straight structure. The corner post 20 is preferably comprised of a tubular structure as shown in FIGS. 1 and 2*a* of the drawings. The corner post 20 may have various cross sectional shapes and sizes. The corner post 20 may be positioned into or upon a ground surface.

The corner post 20 includes a plurality of first receiver apertures 22, a plurality of second receiver apertures 24, a plurality of first fastener apertures 26 and a plurality of second fastener apertures 28 as shown in FIG. 2*a* of the drawings. The first receiver apertures 22 extend substantially transverse into the corner post 20 with respect to the second receiver apertures 24 as shown in FIG. 2*a*. The first receiver apertures 22 may extend completely through the corner post 20 or only through a portion of the corner post 20. The first receiver apertures 22 and the second receiver apertures 24 are formed for receiving the distal portions of the cross members 30.

As shown in FIG. 2*a*, the first receiver apertures 22 and the second receiver apertures 24 are preferably staggered to allow for the respective cross members 30 to be inserted into the corner post 20 without obstructing one another. The first fastener apertures 26 extend completely through the corner post 20 preferably substantially transverse with respect to the first receiver apertures 22 as shown in FIG. 2*a* of the drawings. The second fastener apertures 28 extend through the corner post 20 preferably substantially transverse with respect to the second receiver apertures 24 as further shown in FIG. 2*a* of the drawings.

The first fastener apertures 26 are formed for allowing a corresponding number of fastener members 40 to be inserted through the cross members 30 positioned within the first receiver apertures 22. The second fastener apertures 28 are formed for allowing a corresponding number of fastener members 40 to be inserted through the cross members 30 positioned within the second receiver apertures 24.

C. Center Posts

The center post 50 is comprised of an elongated straight structure (similar to the corner post 20). The center post 50 is preferably comprised of a tubular structure as shown in FIGS. 1 and 2*b* of the drawings. The center post 50 may have various cross sectional shapes and sizes. The center post 50 may be positioned into or upon a ground surface.

The center post 50 includes a plurality of center receiver apertures 52 that extend completely through the center post 50 for receiving the cross members 30. The center receiver apertures 52 are of sufficient size for allowing the complete passing of the cross members 30 there through as shown in FIGS. 1, 3, 4 and 5 of the drawings. The center posts 50 preferably include a plurality of fastener apertures that receive the fastener members 40 for securing the cross members 30 within the center posts 50.

D. End Posts

The end post 60 is comprised of an elongated straight structure (similar to the corner post 20 and center post 50). The end post 60 is preferably comprised of a tubular structure as shown in FIGS. 1 and 2*c* of the drawings. The end post 60 may have various cross sectional shapes and sizes. The end post 60 may be positioned into or upon a ground surface.

The end post 60 preferably includes a plurality of end receiver apertures 62 extending through the end post 60. The end receiver apertures 62 may extend completely through the end post 60 or only through a portion of the end post 60. The end receiver apertures 62 are formed for receiving the distal portions of the cross members 30.

E. Cross Members

The cross members 30 are comprised of an elongated straight structure (similar to the corner post 20, center post 50 and end post 60). The cross members 30 are preferably comprised of a tubular structure. The cross members 30 may have various cross sectional shapes, lengths and sizes, however it is preferably that the outer diameter of the cross members 30 is smaller than the inner diameter of the posts 20, 50, 60.

The cross members 30 are receivable within the receiver apertures 22, 24, 52, 62 of the posts 20, 50, 60. The cross members 30 also preferably include one or more third fastener apertures 32 for receiving the fastener members 40 extending through the posts 20, 50, 60.

F. Fastener Members

Figure 3:
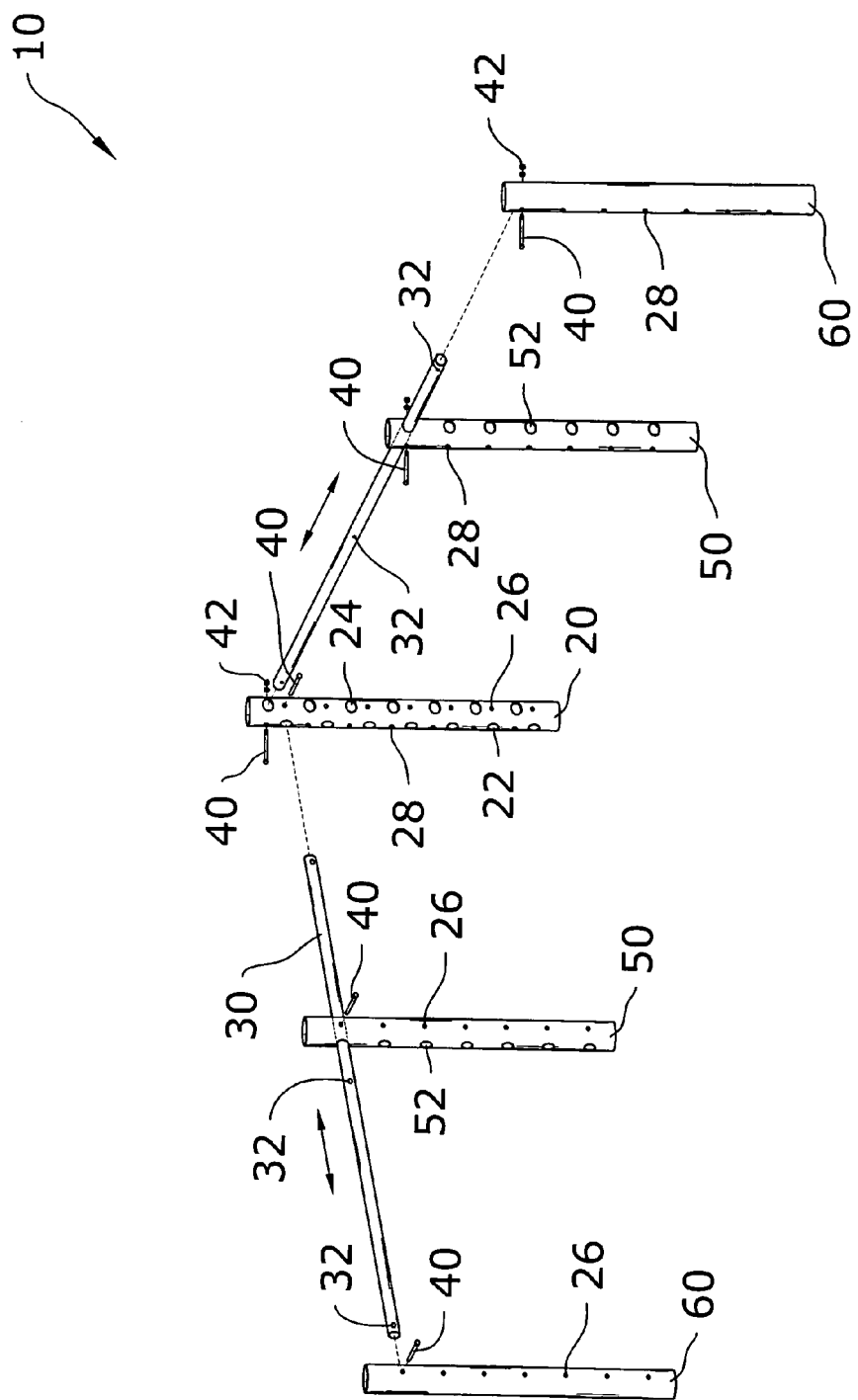
FIG. 3 is an exploded upper perspective view of the present invention.

The plurality of fastener members 40 are extendable through the fastener apertures 22, 24, 32 for securing the cross members 30 within the posts 20, 50, 60. The fastener members 40 may be comprised of any elongated fastener structure (e.g. bolt, screw, pin). The fastener members 40 are preferably comprised of a threaded bolt structure wherein a plurality of corresponding fastener nuts 42 are threadably attached to the same for securing the fastener members 40 within the posts 20, 50, 60 as shown in FIG. 3 of the drawings.

G. Preferred Material of Posts and Cross Members

The posts 20, 50, 60 and the cross members 30 are preferably comprised of a resilient material. The posts 20, 50, 60 and the cross members 30 are preferably comprised of high density polyethylene (HDPE) pipe. The inventor has determined that it is desirable to utilize PE3408 pipe for the posts 20, 50, 60 and the cross members 30.

H. Gate Unit

Figure 6:
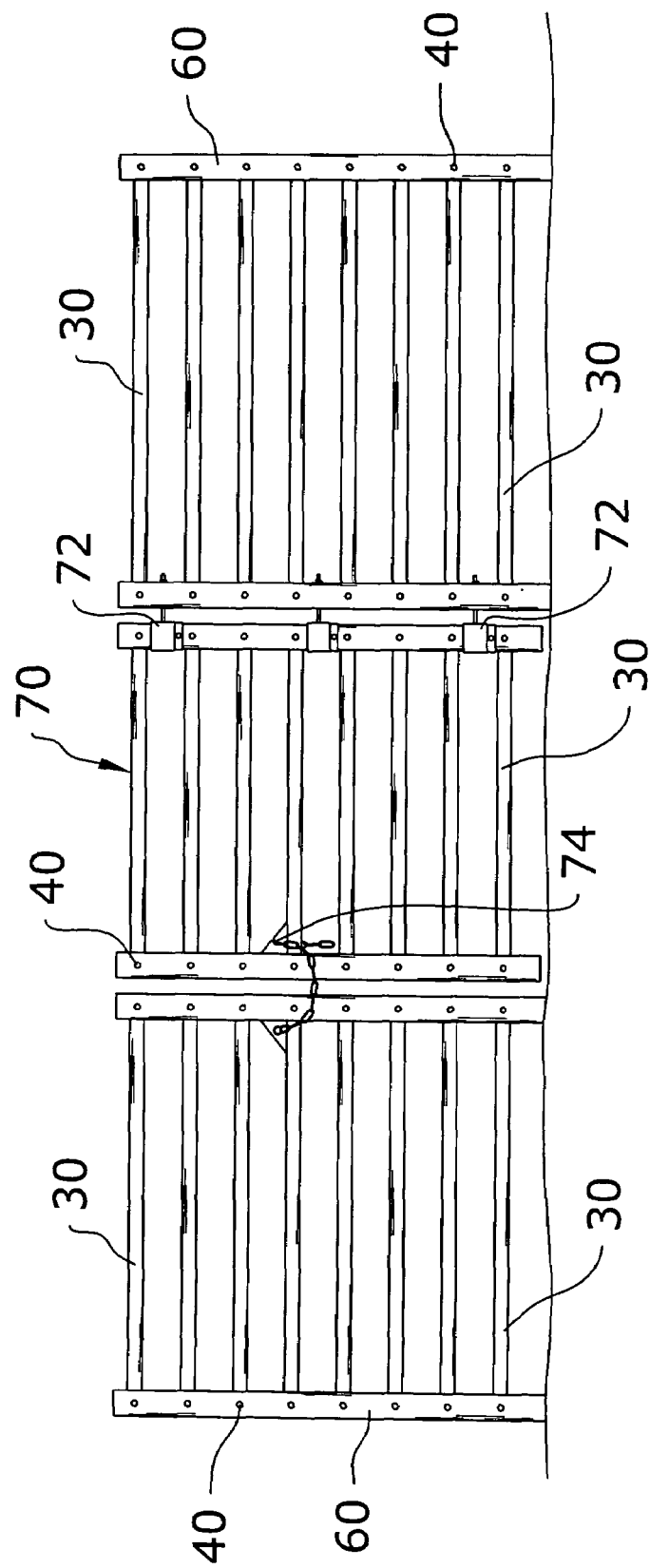
FIG. 6 is a front view of the present invention assembled with a gate unit.

FIG. 6 illustrates a gate unit 70 attached within the present invention. The gate unit 70 is pivotally attached to a plurality of hinges 72 as shown in FIG. 6 of the drawings. The hinges 72 are attached to an end post 60 as further shown in FIG. 6 of the drawings. A connector 74 is utilized for securing the outer pivoting end of the gate unit 70 to another end post 60 as shown in FIG. 6 of the drawings. The gate unit 70 is preferably comprised of a pair of end posts 60 with a plurality of cross members 30 attached between thereof.

I. Operation of Invention

Figure 4:
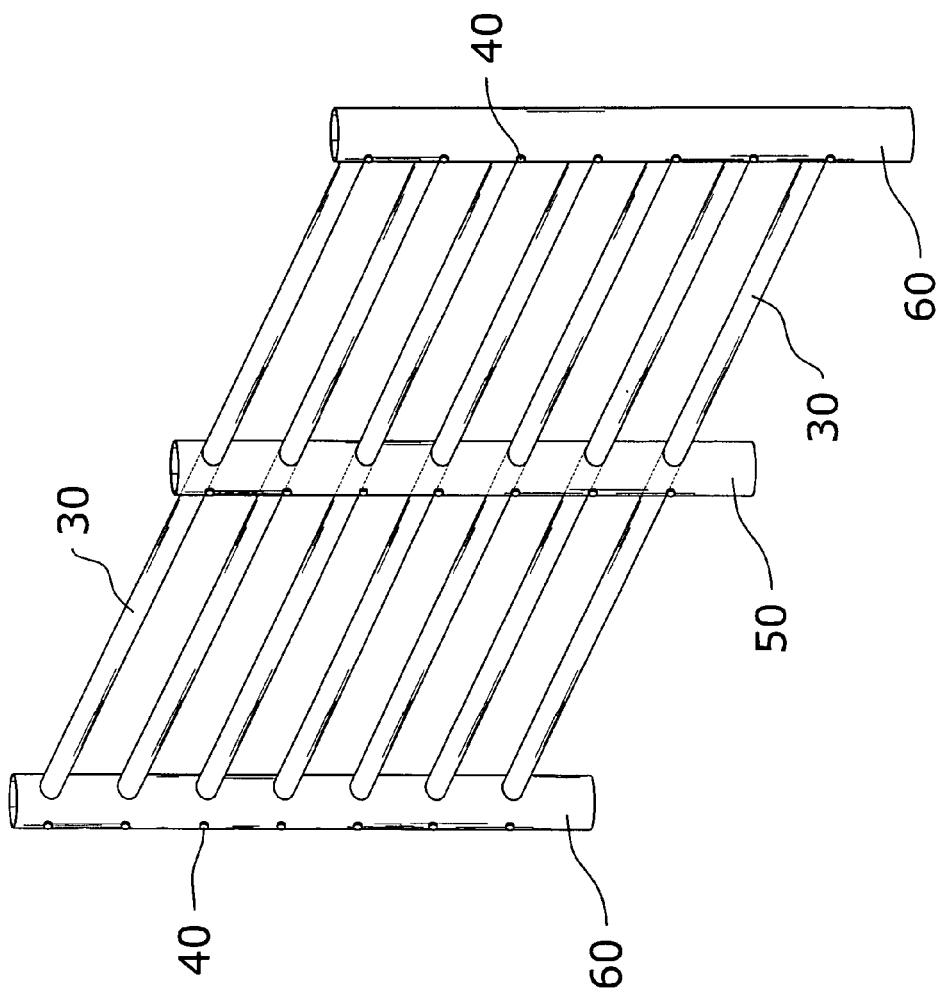
FIG. 4 is an upper perspective view of the present invention assembled as a single panel.
Figure 5:
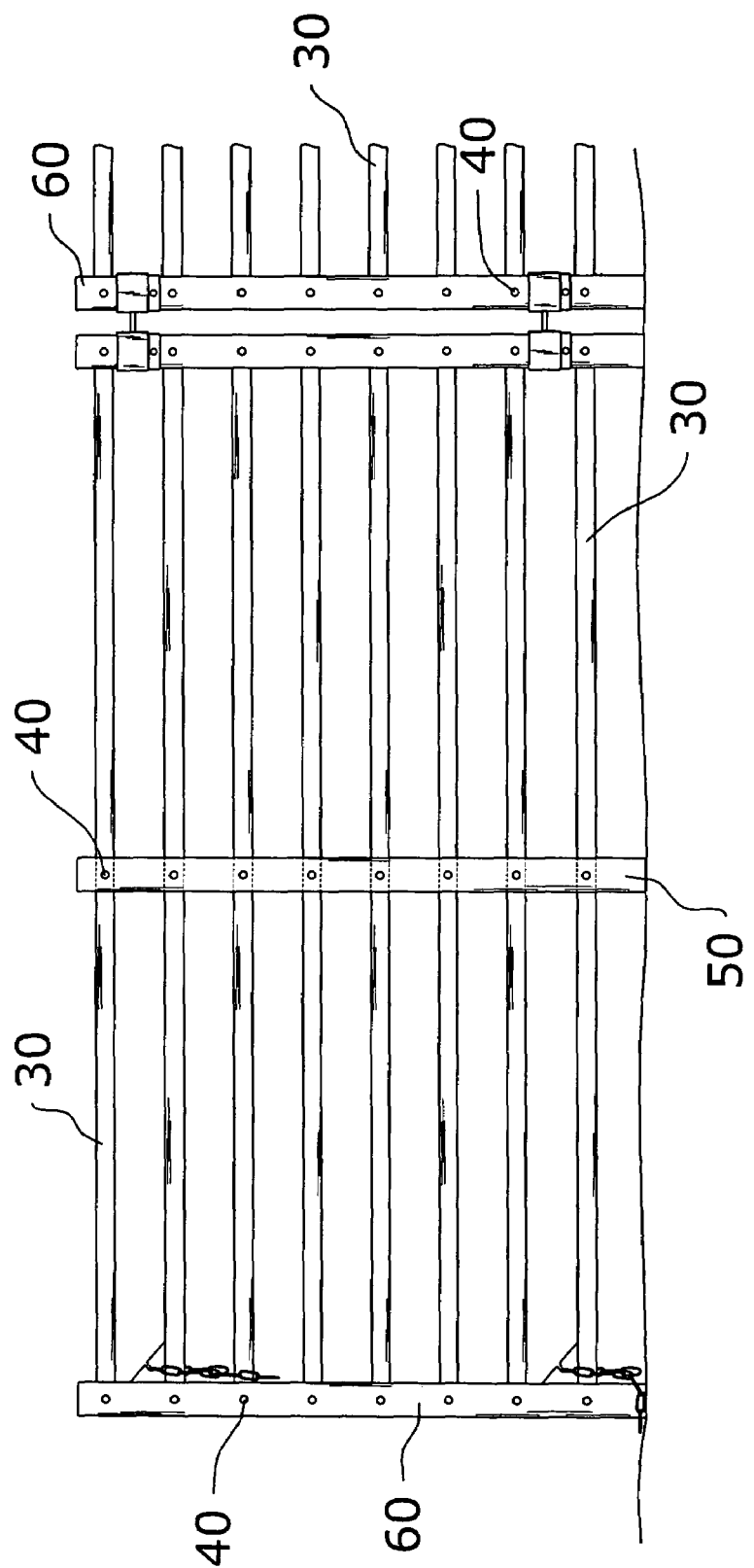
FIG. 5 is a front view of the present invention assembled as a single panel.

In use, the user first determines the shape and dimensions of an area they desire to fence in. The user then selects the required posts 20, 50, 60, cross members 30 and gate units 70 as required to accomplish the same. FIG. 1 illustrates the construction of a corner L-shaped structure. FIG. 4 illustrates the construction of a panel structure. FIG. 5 illustrates the connection of a pair of panels by securing the end posts 60 of each respectively with a chain or other securing structure. The configuration and assembly of the present invention is limited only by the space requirements of the user. The posts 20, 50, 60 may be attached within the ground (e.g. bored holes, etc.) or positioned upon the upper surface of the ground. When the user is finished utilizing the present invention, the user can disassemble the same into a compact storage structure (e.g. the cross members 30, posts 20, 50, 60 can be positioned upon one another in a pile).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A portable livestock panel system, comprising:
   a plurality of posts each include a plurality of receiver apertures;
   a plurality of cross members positioned within said receiver apertures of said posts, wherein said posts and said cross members are comprised of a resilient material;
   wherein said posts and said cross members are comprised of a plastic material;
   a plurality of fastener apertures extending through said posts and said cross members in a corresponding manner, wherein said fastener apertures extend transversely through said posts with respect to a longitudinal axis of said posts and transversely through said cross members with respect to a longitudinal axis of said cross members; and
   a plurality of fastener members extending through said fastener apertures for securing said cross members within said posts.

2. The portable livestock panel system of claim 1, wherein said posts and said cross members are comprised of high density polyethylene pipe.

3. The portable livestock panel system of claim 1, wherein said posts and said cross members are comprised of a polyethylene material.

4. The portable livestock panel system of claim 1, wherein said posts and said cross members are comprised of a tubular structure.

5. The portable livestock panel system of claim 1, wherein said plurality of fastener members each includes a threaded end to receive a corresponding plurality of threaded nuts.

6. A portable livestock panel system, comprising:
   a plurality of posts selected from a group comprised of at least one corner post, at least one center post and at least one end post;
   wherein said at least one corner post includes a plurality of first receiver apertures, a plurality of second receiver apertures, a plurality of first fastener apertures and a plurality of second fastener apertures, wherein said first receiver apertures extend substantially transverse into said corner post with respect to said second receiver apertures, wherein said first fastener apertures extend through said corner post substantially transverse with respect to said first receiver apertures, and wherein said second fastener apertures extend through said corner post substantially transverse with respect to said second receiver apertures;
   wherein said at least one center post includes a plurality of center receiver apertures extending through said center post;
   wherein said at least one end post includes a plurality of end receiver apertures extending through said end post;
   a plurality of cross members receivable within said receiver apertures of said posts, wherein said posts and said cross members are comprised of a resilient material;
   a plurality of center fastener apertures extending through said cross members; and
   a plurality of fastener members extendable through said fastener apertures for securing said cross members within said posts.

7. The portable livestock panel system of claim 6, wherein said posts and said cross members are comprised of high density polyethylene pipe.

8. The portable livestock panel system of claim 6, wherein said posts and said cross members are comprised of a polyethylene material.

9. The portable livestock panel system of claim 6, wherein said posts and said cross members are comprised of a plastic material.

10. The portable livestock panel system of claim 6, wherein said posts and said cross members are comprised of a tubular structure.

11. The portable livestock panel system of claim 6, wherein said plurality of fastener members each includes a threaded end to receive a corresponding plurality of threaded nuts.

12. A portable livestock panel system, comprising:
    a plurality of posts comprised of at least one corner post, at least one center post and at least one end post;
    wherein said at least one corner post includes a plurality of first receiver apertures, a plurality of second receiver apertures, a plurality of first fastener apertures and a plurality of second fastener apertures, wherein said first receiver apertures extend substantially transverse into said corner post with respect to said second receiver apertures, wherein said first fastener apertures extend through said corner post substantially transverse with respect to said first receiver apertures, and wherein said second fastener apertures extend through said corner post substantially transverse with respect to said second receiver apertures;
    wherein said at least one center post includes a plurality of center receiver apertures extending through said center post;
    wherein said at least one end post includes a plurality of end receiver apertures extending through said end post;
    a plurality of cross members receivable within said receiver apertures of said posts, wherein said posts and said cross members are comprised of a resilient material;

a plurality of center fastener apertures extending through said cross members; and a plurality of fastener members extendable through said fastener apertures for securing said cross members within said posts.

13. The portable livestock panel system of claim 12, wherein said posts and said cross members are comprised of high density polyethylene pipe.

14. The portable livestock panel system of claim 12, wherein said posts and said cross members are comprised of a polyethylene material.

15. The portable livestock panel system of claim 12, wherein said posts and said cross members are comprised of a plastic material.

16. The portable livestock panel system of claim 12, wherein said posts and said cross members are comprised of a tubular structure.

17. The portable livestock panel system of claim 12, wherein said plurality of fastener members each includes a threaded end to receive a corresponding plurality of threaded nuts.

* * * * *